United States Patent [19]

Jesson et al.

[11] Patent Number: 4,836,730
[45] Date of Patent: Jun. 6, 1989

[54] FASTENER

[75] Inventors: George Jesson, Campbellsville, Ky.; Larry J. Arnold, Statesville, N.C.

[73] Assignee: Emhart Industries, Inc., Farmington, Conn.

[21] Appl. No.: 692,418

[22] Filed: Jan. 17, 1985

[51] Int. Cl.⁴ .............................................. F16B 25/00
[52] U.S. Cl. ...................................... 411/387; 411/417
[58] Field of Search ............... 411/386, 387, 417, 418, 411/420; 408/215, 216, 227, 229, 230

[56] References Cited

U.S. PATENT DOCUMENTS

| | | | |
|---|---|---|---|
| 3,125,923 | 3/1964 | Hanneman | 411/386 |
| 3,241,426 | 3/1966 | Gutshall | 411/387 |
| 3,395,603 | 8/1968 | Skierski | 411/387 |
| 3,463,045 | 8/1969 | Prescott | 411/387 |
| 3,507,183 | 4/1970 | Thurston | 411/387 |
| 3,517,581 | 6/1970 | Stokes et al. | 411/387 |
| 3,786,713 | 1/1974 | Sygnator | 411/387 |
| 3,789,725 | 2/1974 | Lindstrom | 411/418 |
| 4,064,784 | 12/1977 | Adler | 411/387 |
| 4,114,507 | 9/1978 | Fischer et al. | 411/387 |
| 4,147,088 | 4/1979 | Whittaker, Jr. | 411/387 |
| 4,556,347 | 12/1985 | Barish | 408/230 |
| 4,561,813 | 12/1985 | Schneider | 408/230 |
| 4,565,471 | 1/1986 | Negishi et al. | 408/227 |
| 4,568,229 | 2/1986 | Hulsey | 411/387 |

Primary Examiner—Gary L. Smith
Assistant Examiner—Suzanne L. Dino
Attorney, Agent, or Firm—Thomas S. Szatkowski

[57] ABSTRACT

A drilling and thread forming fastener is provided having a threaded shank and a pilot end. The fastener pilot end in cross section has a major and minor axis intersecting at the fastener center of rotation. A pair of arcuate flutes are disposed in opposed quadrants from a pair of arcuate lands, each of said arcuate flutes and an arcuate land intersecting on the major axis to form a cutting edge of the fastener, the two cutting edges being disposed in a plane containing the center of rotation of the fastener.

The fastener construction is adaptable to applications in relatively thick materials including cement or cinder block, and is effective to increase tool life when manufactured by a forging process.

5 Claims, 3 Drawing Sheets

FASTENER

BACKGROUND OF THE INVENTION

Field of the Invention

The present invention relates to drilling and thread forming fasteners and more particularly to a drilling and thread forming fastener capable of manufacture by a forging process.

In the art of fastener manufacturing, a type of threaded fastener having the capabilities of drilling a pilot hole and forming threads for entry of the fastener, all combined in the same operation is well known. It is also known to manufacture these fasteners by employing a pair of dies which are effective to forge the drilling point into a configuration which is best suited for the drilling operation in a particular material, or for a particular size fastener. One such a fastener is shown in U.S. Pat. No. 3,395,603 issued Aug. 6, 1968, to E. J. Skierski and assigned to the assignee of the present invention.

While many of these drilling and thread forming fasteners have gained commercial acceptance, including the above cited Skierski fastener configuration, areas have been uncovered which are considered to be subject to improvement, to provide both increased utility of the particular fastener, and ease of manufacturing with a decrease in cost per fastener.

For instance it has been found that many of the prior art drilling and thread forming fasteners are not adaptable to performing their function in heavier gauge materials, that is material of a thickness greater than five-sixteenths (5/16) of an inch. While some of the fasteners disclosed in the prior art have the capability to perform this drilling function, the high heat generated by the drilling operation in addition to the increase drilling time, in many applications, render the use of the self-drilling and thread forming fasteners undesirable.

In the area of manufacture, many of the prior art drilling and thread forming fasteners are constructed having an outer pilot end surface which in cross section contains a number of sharp corners or sharp recesses which are designed into the drilling tip. Such sharp corners are detrimental when the fastener is manufactured by a forging process employing a female die to produce the fastener pilot end in that they create stress areas in the female die. Over a period of time, the stress areas are subject to cracking and will eventually result in die breakage of a premature nature. Thus, dies employed to manufacture that type of fastener having a plurality of sharp external surfaces which are subject to replacement after a somewhat limited number of cycles of use.

It is therefore the object of the present invention to provide a drilling and thread forming fastener which is particularly adopted for use in heavier gauge materials for instance those materials having a thickness greater than a five-sixteenths (5/16) of an inch.

A further object of the invention is to provide a drilling and thread forming fastener of the type discussed, wherein sharp corners in the fastener pilot end which are produced by sharp recesses in a forging die are reduced, or eliminated, to allow manufacture of the fastener by the forging process employing a die having few, if any, sharp recesses on the forming surface.

SUMMARY OF THE INVENTION

The above objects and other objects which will become apparent as the description proceeds, are accomplished by providing a drilling and thread forming fastener comprising a threaded shank and a pilot end, the pilot end having a major axis extending through the center of rotation of the fastener and a minor axis intersecting the major axis at right angles at the fastener center of rotation and of less length than the major axis. A pair of flutes are formed in the pilot end in opposed quadrants formed by the major and minor axis, and extend longitudinally and parallel with the center of rotation of the fastener and a pair of lands are disposed in opposed quadrants adjacent the flutes, the flutes being substantially of arcuate cross sections and the lands of substantially arcuate cross sections throughout the greater portion of the pilot end length. The arcuate cross section of a flute and the arcuate cross section of a land terminate at an intersection to form a pilot cutting edge at a terminal point of the major axis.

BRIEF DESCRIPTION OF THE DRAWING

For a more complete understanding of the invention, reference should be made to the following description, taken in conjunction with the accompanying drawing wherein.

DESCRIPTION OF THE PREFERRED EMBODIMENT

Figure 1:
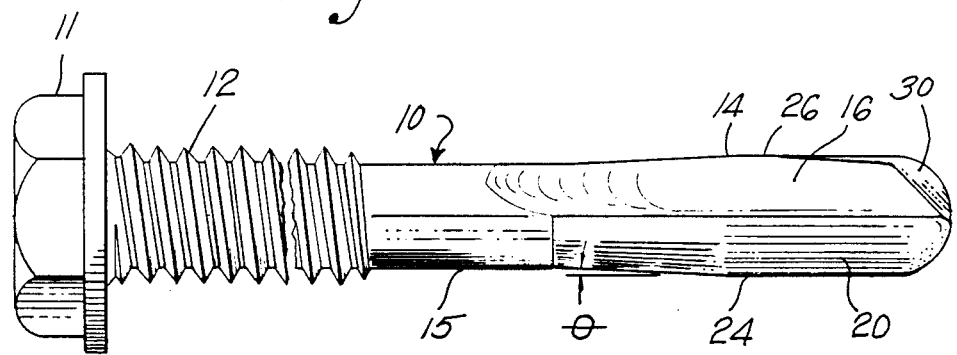
FIG. 1 is an elevational view showing a drilling and thread forming fastener constructed in accordance with the teaching of the present invention.
Figure 2:
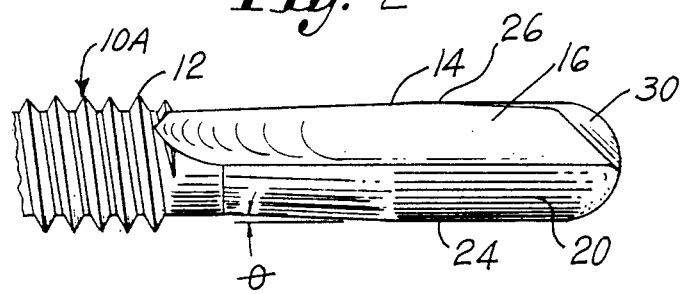
FIG. 2 is a fragmentary elevational view similar to FIG. 1 showing an alternate construction of a portion of the fastener.

Referring now to the drawings, and in particular to FIGS. 1 and 2, there is shown a drilling and thread forming fastener 10 having a hexagonal head 11, a threaded shank 12 and a pilot end 14. The fastener of FIG. 1 also comprises an unthreaded shank portion 15 which extends from the threaded portion 12 to the pilot end 14.

The fastener 10A depicted in FIG. 2 is identical to that of FIG. 1 but for the deletion of the unthreaded shank portion 15 which is shown in FIG. 1. Depending on the particular application, the unthreaded shank portion 15 may be of any suitable length, or may be eliminated, in which instance the pilot end 14 extends into the threaded portion, as in FIG. 2.

The threaded shank 12 may contain lobes (not shown), or other form of thread forming elements well known in the art (not shown) which serve to provide threads in an opening formed by the pilot end 14 of either the fastener shown in FIG. 1 or FIG. 2.

Figure 3:
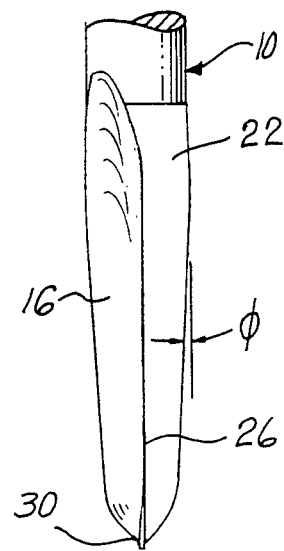
FIG. 3 is a fragmentary elevational view showing a portion of the structure of FIG. 1 viewed at 90° from the showing in FIG. 1.
Figure 4:
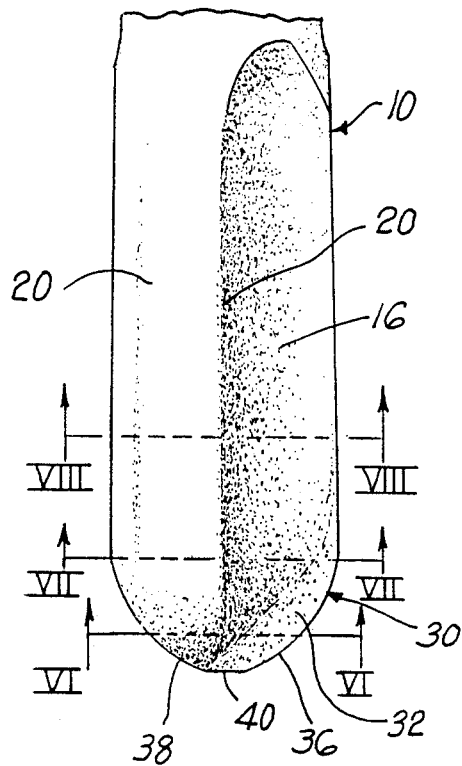
FIG. 4 is a fragmentary elevational view showing a portion of the structure of FIG. 1 taken on an enlarged scale for clarity.
Figure 5:
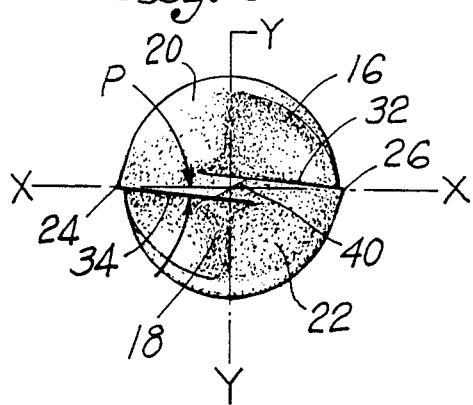
FIG. 5 is an end view showing the structure of FIG. 4.

Referring now to FIGS. 3, 4 and 5, the pilot end 14 is shown in detail as comprising a pair of arcuately shaped flutes 16 and 18 formed over substantially the length of the pilot end, and a pair of arcuate lands 20 and 22 adjacent the flutes.

Figure 7:
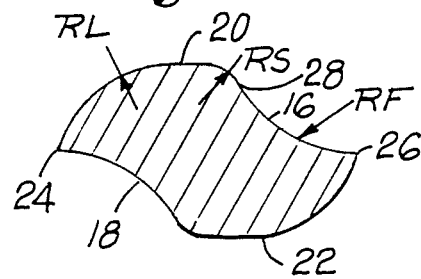
FIG. 7 is a cross-sectional view taken along the lines VII—VII of FIG. 4 showing further details of the structure.
Figure 8:
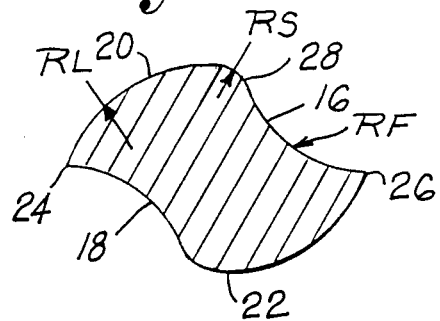
FIG. 8 is a cross-sectional view taken along the lines VIII—VIII of FIG. 4 showing the fastener details at that section.

Referring to FIG. 5, it will be noted that a major axis X and a minor axis Y of the fastener, which are at right angles to one another, pass through the center of rotation of the fastener and define the minimum dimension (on the Y axis) and the maximum dimension (along the X axis) of the fastener. It will also be noted from FIG. 5 that the intersection of the arcuate land 20 or 22 with an associate arcuate flute 16 or 18 occurs on the major axis X—X and defines a pilot cutting edge 24 or 26 which lies in a plane with the center of rotation of the fastener. This pilot cutting edge 24 or 26 extends over the greater portion of the pilot end 14 and is depicted in FIGS. 7 and 8 which are sections taken along the pilot end of the fastener. It will be understood that the configuration of the pilot end 14 is such that opposed quadrants of the fastener contain the lands 20, 22 and the flutes 16, 18 which are dimensionally the same at any right angle section of the fastener 10 or 10A and any description of the invention which will be made with reference to flute 16 and land 20 will be equally applicable to flute 18 and land 22.

In FIGS. 7 and 8, land 20 and flute 16 are shown having a respective radius RL and RF defining surfaces which meet at a surface 28 having a radius RS, which radius is smaller than that radius of land 20, or flute 16. Thus, the entire surface of the pilot end 14 over substantially the entire length of the pilot end contains no sharp corners other than the cutting edges 24 and 26. A drilling tip 30 is formed at the distal end of the pilot end 14 and at the maximum dimension along the X—X plane of the cutting edges 24, 26. The cutting edges 24 and 26 extend from the cutting tip 30 towards the head 11 of the fastener inwardly towards the center of rotation of the fastener at an angle $\theta$ which is generally in the area of one degree, depending upon the application.

Referring to FIG. 3, it will be seen that the dimension of the pilot end 14 along the minor axis also is provided with a taper angle $\phi$ which is in the area of four degrees (4°) and in the opposite direction from that of the pilot end cutting edges, tapering toward the center of rotation of the fastener, from the threaded shank towards the drilling tip 30.

Reference should now be made to FIGS. 3, 4 and 5 wherein the drilling tip 30 is shown in detail. The drilling tip 30 comprises a pair of substantially flat planar surfaces 32, 34 which extend from the widest most part of the pilot end 14 to a point adjacent the intersection of the X and Y axes of the fastener and are disposed at an angle $\rho$ to the X axis as best shown in FIG. 5. Each of the planar surfaces 32 and 34 terminate at radial cutting edge 36 or 38 and are connected by a linear tip cutting edge 40 intersecting the axis of rotation of the fastener.

In operation, the drilling tip 30 performs the function of starting the drilling operation when the tip cutting edge 40 is rotated into the material and the radial cutting edges 36, 38 serve their drilling function in the metal, much in the manner of a power drill. However, the transition rom this operation takes place between the flat planar surfaces 32, 34 which are provided with a transition into the flutes 16 and 18, wherein metal chips are directed upwardly and out of the opening being formed by the drill tip 30. The heavy gauge material then is encountered by the pilot end cutting edges 24 and 26 which serve to continually ream the material from the drilled portion, and to direct chips of material upwardly and away from the drilled hole. Thus, the combination of surfaces serves to produce a fastener having a pilot end 14 which is efficient and effective in drilling materials of heavier gauge, yet may be employed over a wide range of material thicknesses.

Additionally, it has been found that the disclosed configuration, in addition to its applicability where heavy gauge metal materials are used, is extremely effective in cement or cinder block applications.

Figure 6:
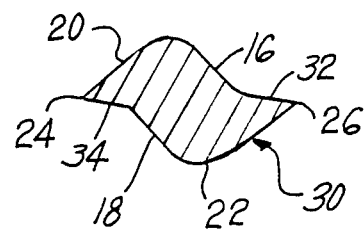
FIG. 6 is a cross-sectional view taken along the lines VI—VI of FIG. 4 showing details of the structure.

In the context of manufacturing, it will be noted from the sections shown in FIGS. 6, 7 and 8 that in manufacturing the subject fastener by a forging process, if the dies are manufactured to separate at the cutting edges 24 or 26, that is, the separation point of the dies lies along the axis X—X of the fastener 10, the entire die cavity may be constructed without any sharp indentations on the surfaces thereby eliminating stress areas within the forging dies. This is an extremely important factor in the manufacture of drilling and thread forming fasteners by the forging process, in that the life of the die is an important economic factor in the mass production of such fasteners.

Figure 9:
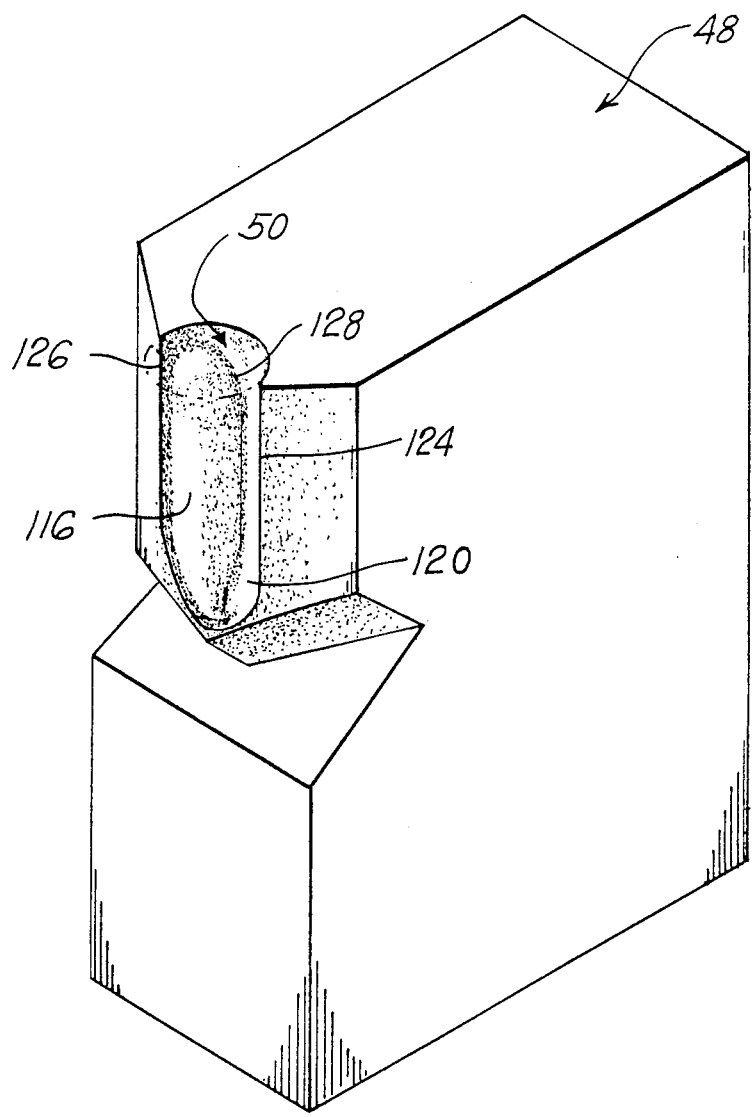
FIG. 9 is an elevational perspective view showing one of a pair of dies employed in the manufacture of the fastener of FIGS. 1 through 8.

A die 48 which comprises one-half of a die set employed in the manufacture of the fastener 10 or 10A is shown in FIG. 9 wherein a cavity 50 is formed in the die to forge an article of round stock into the desired configuration, when pressed between mating dies.

The cavity 50 comprises an outwardly projecting arcuate surface 116 for forming the flute 16, inwardly projecting an arcuate surface 120 for forming the land 20 and a smaller radius arcuate surface 128. With a pair of mating dies constructed in the form of die 48, the cutting edges 24, 26, 36, 38 and 40 are all formed at the separation line 124 of the dies. Therefore, there are no sharp angles or indentations formed in the cavity 50, and stress points are substantially reduced in the die 48, and its corresponding mating die (not shown).

It has therefore been shown that by constructing a drilling and thread forming fastener within the teachings of the present invention, the various objects set forth are achieved and the fastener having the capability of application to substantially thicker gauge materials than would be possible with prior art fasteners is achieved. The desirability of the fastener is further increased in that the manufacture of the fastener is more economical than in the prior art, due to increased die life.

We claim:

1. A drilling and thread forming fastener comprising a threaded shank and a pilot end, said pilot end having a major axis extending through the center of rotation of said fastener, and a minor axis intersecting said major axis at right angles at the fastener center of rotation and of less length than said major axis, a pair of flutes formed in said pilot end in opposed quadrants and extending longitudinally and parallel with the center of rotation of said fastener, a pair of lands disposed in opposed quadrants adjacent said flutes, said flutes being of substantially arcuate cross sections throughout the greater portion of said pilot end and said lands being of substantially arcuate cross sections throughout the greater portion of said pilot end, said arcuate cross section of a said flute and said arcuate cross section of a said land terminating at an intersection at said major axis to form a pilot cutting edge, wherein each of said cutting edges lies in a plane containing said fastener axis of rotation over substantially the length of said cutting edge and wherein said pilot end terminates at a drilling tip, said drilling tip being formed by a pair of radial tip cutting edges each extending from a said pilot cutting edge to a point at the end of said tip and being interconnected one to the other by a transverse cutting edge crossing said plane.

2. A drilling and thread forming fastener as set forth in claim 1 wherein said drilling tip comprises a pair of planar surfaces each extending inwardly from a said pilot cutting edge in opposed quadrants of said fastener and terminating substantially in a line running from a said pilot cutting edge to said tranverse cutting edge.

3. A drilling and thread forming fastener as set forth in claim 1 wherein said drilling tip comprises a pair of planar surfaces each extending inwardly from a said pilot cutting edge in opposed quadrants of said fastener and terminating substantially on a line running from said pilot cutting edge intersection with a said radial tip cutting edge to said transverse cutting edge.

4. A drilling and thread forming fastener as set forth in claim 3 wherein said cutting edge is tapered inwardly toward said axis of rotation in said plane, in the direction of said threaded shank.

5. A drilling and thread forming fastener as set forth in claim 4 wherein said flutes extend into a least one thread of said threaded shank.

* * * * *